United States Patent
Herz et al.

(10) Patent No.: US 7,671,756 B2
(45) Date of Patent: Mar. 2, 2010

(54) PORTABLE ELECTRONIC DEVICE WITH ALERT SILENCING

(75) Inventors: Scott Herz, Santa Clara, CA (US); Dan Keen, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 250 days.

(21) Appl. No.: 11/770,727

(22) Filed: Jun. 28, 2007

(65) Prior Publication Data

US 2008/0165022 A1    Jul. 10, 2008

Related U.S. Application Data

(60) Provisional application No. 60/883,802, filed on Jan. 7, 2007.

(51) Int. Cl.
*G08B 21/00* (2006.01)

(52) U.S. Cl. ............... 340/669; 340/576; 340/575; 340/825.36; 340/825.49; 340/539.1; 340/539.11; 340/539.13

(58) Field of Classification Search ............. 340/575, 340/576, 669, 825.36, 825.49, 539.1, 539.11, 340/539.13; 379/418
See application file for complete search history.

(56) References Cited

U.S. PATENT DOCUMENTS

| 5,488,354 A | * | 1/1996 | Bobby ................. 340/576 |
| 6,400,814 B1 | * | 6/2002 | Adams ............... 379/142.01 |
| 2006/0017692 A1 | * | 1/2006 | Wehrenberg et al. ...... 345/156 |
| 2007/0036347 A1 | * | 2/2007 | Teicher .................. 379/418 |

* cited by examiner

*Primary Examiner*—Daryl Pope
(74) *Attorney, Agent, or Firm*—Morgan, Lewis & Bockius LLP

(57) ABSTRACT

In some embodiments, audible alerts issued by a portable electronic device can be silenced in response to user smacks on the body of the device. These audible alerts are initiated by applications running on the device, such as email, phone, alarm, and/or timer applications. In some embodiments, the device includes one or more accelerometers that detect and signal the user smacks. In some embodiments, the alert response mode of the device (such as whether it rings or vibrates to signal an alert) can be changed in response to predefined patterns of user smacks.

10 Claims, 9 Drawing Sheets

PORTABLE ELECTRONIC DEVICE WITH ALERT SILENCING

RELATED APPLICATIONS

This application claims priority to U.S. Provisional Patent Application No. 60/883,802, filed Jan. 7, 2007, entitled "Portable Electronic Device With Alert Silencing," which application is incorporated by referenced herein in its entirety.

This application is related to the following applications: (1) U.S. patent application Ser. No. 10/188,182, "Touch Pad For Handheld Device," filed on Jul. 1, 2002; (2) U.S. patent application Ser. No. 10/722,948, "Touch Pad For Handheld Device," filed on Nov. 25, 2003; (3) U.S. patent application Ser. No. 10/643,256, "Movable Touch Pad With Added Functionality," filed on Aug. 18, 2003; (4) U.S. patent application Ser. No. 10/654,108, "Ambidextrous Mouse," filed on Sep. 2, 2003; (5) U.S. patent application Ser. No. 10/840,862, "Multipoint Touchscreen," filed on May 6, 2004; (6) U.S. patent application Ser. No. 10/903,964, "Gestures For Touch Sensitive Input Devices," filed on Jul. 30, 2004; (7) U.S. patent application Ser. No. 11/038,590, "Mode-Based Graphical User Interfaces For Touch Sensitive Input Devices" filed on Jan. 18, 2005; (8) U.S. patent application Ser. No. 11/057,050, "Display Actuator," filed on Feb. 11, 2005; (9) U.S. Provisional Patent Application No. 60/658,777, "Multi-Functional Hand-Held Device," filed Mar. 4, 2005; (10) U.S. patent application Ser. No. 11/367,749, "Multi-Functional Hand-Held Device," filed Mar. 3, 2006; (11) U.S. Provisional Patent Application No. 60/824,769, filed Sep. 6, 2006, entitled "Portable Multifunction Device"; (12) U.S. Provisional Patent Application No. 60/879,253, filed Jan. 7, 2007, entitled "Portable Multifunction Device"; and (13) U.S. Provisional Patent Application No. 60/879,469, filed Jan. 8, 2007, entitled "Portable Multifunction Device." All of these applications are incorporated by reference herein.

TECHNICAL FIELD

The disclosed embodiments relate generally to portable electronic devices, and more particularly, to portable devices with audible alerts to notify users of incoming phone calls, emails, and/or other messages or conditions of interest.

BACKGROUND

As portable electronic devices become more compact, and the number of functions performed by a given device increase, it has become a significant challenge to design a user interface that allows users to easily interact with a multifunction device. This challenge is particularly significant for handheld portable devices, which have much smaller screens than desktop or laptop computers. This situation is unfortunate because the user interface is the gateway through which users receive not only content but also responses to user actions or behaviors, including user attempts to access a device's features, tools, and functions. Some portable communication devices (e.g., mobile telephones, sometimes called mobile phones, cell phones, cellular telephones, and the like) have resorted to adding more pushbuttons, increasing the density of push buttons, overloading the functions of pushbuttons, or using complex menu systems to allow a user to access, store and manipulate data. These conventional user interfaces often result in complicated key sequences and menu hierarchies that must be memorized by the user.

Many conventional user interfaces, such as those that include physical pushbuttons, are also inflexible. This is unfortunate because it may prevent a user interface from being configured and/or adapted by either an application running on the portable device or by users. When coupled with the time consuming requirement to memorize multiple key sequences and menu hierarchies, and the difficulty in activating a desired pushbutton, such inflexibility is frustrating to most users.

Portable electronic devices commonly provide audible alerts to notify users of incoming phone calls, emails, or other messages or conditions of interest (such as a low battery warning). To prevent unwanted audible alerts in certain situations (such as during concerts, classes, movies or meetings), these devices commonly provide operating modes in which the alerts are silenced or issued through other inaudible means (such as vibrations or flashing lights). Even though inaudible alert modes are available, users often forget to activate them, as a result of which their multifunction devices may issue unwelcome audible alerts. When this happens, a user can wait for an alert to cease, or try to silence the device mid-alert through interaction with the device's user interface (e.g., buttons, stylus or touch screen). This can be challenging when the device is in the user's pocket, handbag, briefcase or backpack, in which case the user must first extract the device and then silence the alert via the device's interface. Then, even if the user manages to silence the device, should they wish to avoid further alerts they will need to once again interact with the device's interface to place the device into silent mode.

Thus, there is a need for portable electronic devices that provide improved user interfaces through which ongoing audible alerts can be readily silenced and alert modes managed.

SUMMARY

The above deficiencies and other problems associated with user interfaces for portable devices are reduced or eliminated by the disclosed portable multifunction device. In some embodiments, the device has a touch-sensitive display (also known as a "touch screen") with a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive display. In some embodiments, the functions may include telephoning, video conferencing, e-mailing, instant messaging, blogging, digital photographing, digital videoing, web browsing, digital music playing, and/or digital video playing.

In some embodiments, the device incorporates acceleration sensors, or accelerometers, that are responsive to user gestures exerted on the device as a whole. These sensors enable the user to silence audio alerts and/or modify alert modes through light "smacks" on the device's body, even if the device is in a pocket or other enclosure. Instructions for performing these functions may be included in a computer program product configured for execution by one or more processors.

In accordance with some embodiments, a computer-implemented method at a portable electronic device includes: detecting with an accelerometer associated with the device a movement of the portable device; determining whether the movement is due to a predetermined type of user gesture exerted on the portable electronic device; and, if the movement is due to the predetermined type of user gesture and the portable electronic device is emitting an audible alert signal, silencing the audible alert signal.

In accordance with some embodiments, a computer-implemented method at a portable electronic device includes: detecting with a sensor a user gesture exerted on the portable electronic device; determining whether the user gesture is of a predetermined type; and, if the gesture is of the predetermined type and the portable electronic device is emitting an audible alert signal, silencing the audible alert signal.

In accordance with some embodiments, a portable electronic device includes: one or more processors; a memory; an alert annunciator; an accelerometer that is responsive to movement of the device; and one or more programs, stored in the memory. The one or more programs, when executed by the one or more processors, respond to signals from the accelerometer, and control and respond to alert status data for the annunciator. The one or more programs are configured to determine whether the signals from the accelerometer are due to a predetermined type of user gesture exerted on the portable electronic device and, if the movement is due to the predetermined type of user gesture and the alert status data show the alert annunciator is emitting an audible alert signal, to silence the audible alert signal.

In accordance with some embodiments, a portable electronic device includes: one or more processors; a memory; an alert annunciator; an accelerometer that is responsive to movement of the device; and one or more programs, stored in the memory. The one or more programs, when executed by the one or more processors, respond to signals from the accelerometer, and control alert status data for the annunciator. The one or more programs are configured to determine whether the signals from the accelerometer are due to a predetermined type of user gesture exerted on the portable electronic device and, if the movement is due to the predetermined type of user gesture, to set the alert status data so as to suppress an audible alert signal.

In accordance with some embodiments, a portable electronic device includes: one or more processors; a memory; an audible alert emitter; a sensor configured to detect movement of the portable device and output at least one sensor signal characteristic of such movement; and one or more programs, wherein the one or more programs are stored in the memory and configured to be executed by the one or more processors. The programs include: instructions for detecting occurrence of a predetermined gesture exerted on the portable device, the detecting being based on characteristics of the at least one sensor signal; and instructions for modifying operation of the audible alert emitter based on occurrence of the predetermined gesture.

In accordance with some embodiments, a portable electronic device includes: means for detecting a movement of the portable device; means for determining whether the movement is due to a predetermined type of user gesture exerted on the portable electronic device; and, if the movement is due to the predetermined type of user gesture and the portable electronic device is emitting an audible alert signal, means for silencing the audible alert signal.

Thus, the invention provides portable electronic devices with improved user interfaces through which ongoing audible alerts can be readily silenced and alert modes managed.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1:
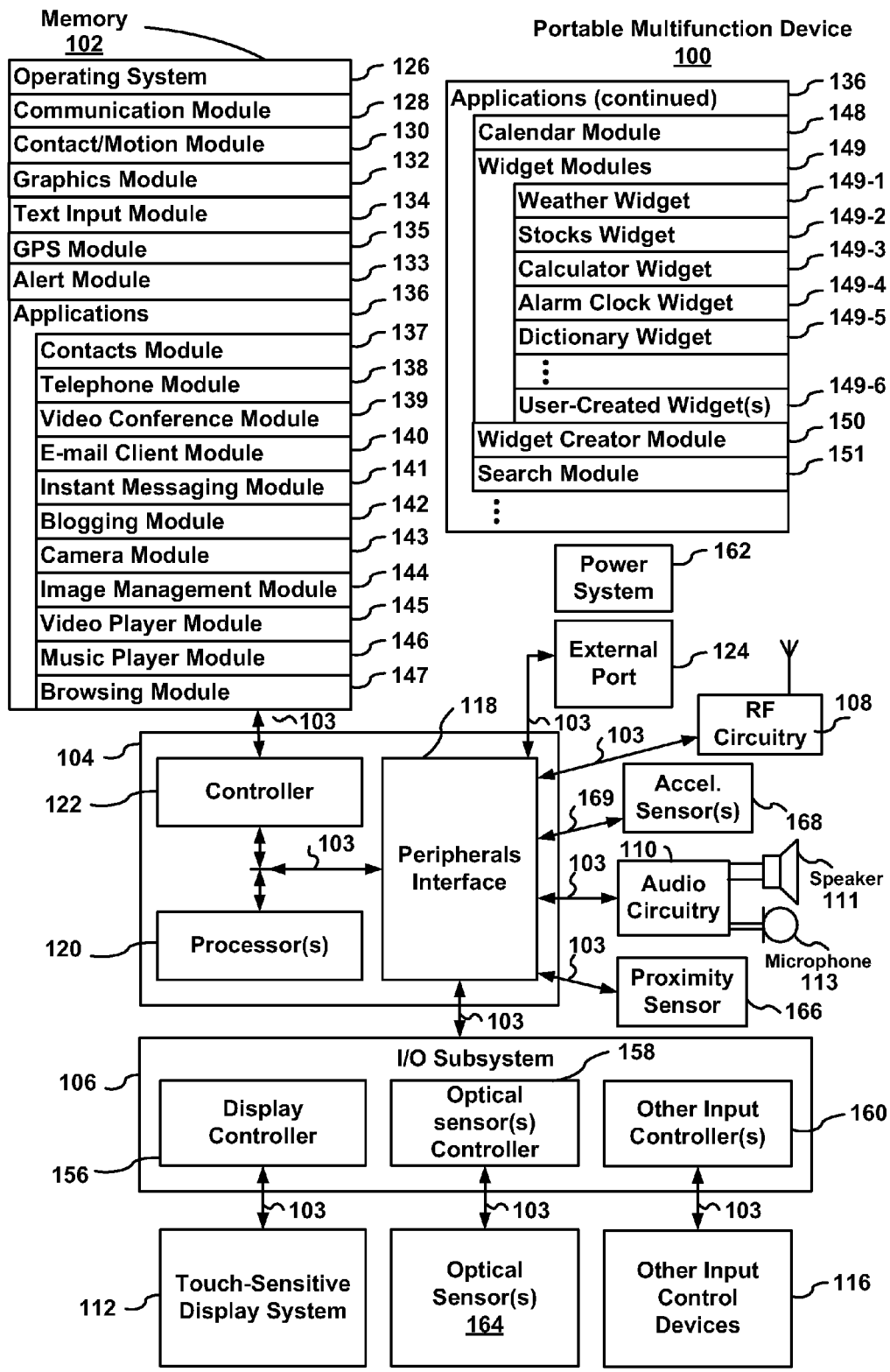
FIG. 1 is a block diagram illustrating a portable multifunction device with a touch-sensitive display and an acceleration sensor in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

Embodiments of a portable multifunction device, user interfaces for such devices, and associated processes for using such devices are described. In some embodiments, the device is a portable communications device such as a mobile telephone that also contains other functions, such as PDA and/or music player functions.

The user interface may include a click wheel in addition to a touch screen. A click wheel is a physical user-interface device that may provide navigation commands based on an angular displacement of the wheel or a point of contact with the wheel by a user of the device. A click wheel may also be used to provide a user command corresponding to selection of one or more items, for example, when the user of the device presses down on at least a portion of the wheel or the center of the wheel. For simplicity, in the discussion that follows, a portable multifunction device that includes a touch screen is used as an exemplary embodiment. It should be understood, however, that some of the user interfaces and associated processes may be applied to other devices, such as personal computers and laptop computers, that may include one or more other physical user-interface devices, such as a click wheel, a physical keyboard, a mouse and/or a joystick.

The device supports a variety of applications, such as a telephone application, a video conferencing application, an e-mail application, an instant messaging application, a blogging application, a digital camera application, a digital video camera application, a web browsing application, a digital music player application, and/or a digital video player application.

The various applications that may be executed on the device may use at least one common physical user-interface device, such as the touch screen. One or more functions of the touch screen as well as corresponding information displayed on the device may be adjusted and/or varied from one application to the next and/or within a respective application. In this way, a common physical architecture (such as the touch screen) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the portable device may utilize common and/or different keyboard embodiments. Thus, the keyboard embodiment used may be tailored to at least some of the applications. In some embodiments, one or more keyboard embodiments may be tailored to a respective user. For example, based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Attention is now directed towards embodiments of the device. FIG. 1 is a block diagram illustrating a portable multifunction device 100 with a touch-sensitive display 112 in accordance with some embodiments. The touch-sensitive display 112 is sometimes called a "touch screen" for convenience, and may also be known as or called a touch-sensitive display system. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164 and one or more acceleration sensors 168. References to the speaker 111 in the context of alert processing should be understood to encompass other types of sound sources, such as a chime, bell, buzzer or ringer, to name a few possibilities. The speaker 111 or other sound source may function as an alert annunciator (e.g., an audible alert emitter), as described in more detail below. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIG. 1 may be implemented in hardware, software or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (not shown). The headset jack provides an interface between the audio circuitry 110 and removable audio input/ output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive display (touch screen) 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects, further details of which are described below.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112. A touch-sensitive display in some embodiments of the touch screen 112 may be analogous to the multi-touch sensitive tablets described in the following U.S. Pat. Nos. 6,323,846 (Westerman et al.), 6,570,557 (Westerman et al.), and/or 6,677,932 (Westerman), and/or U.S. Patent Publication 2002/0015024A1, each of which is hereby incorporated by reference. However, a touch screen 112 displays visual output from the portable device 100, whereas touch sensitive tablets do not provide visual output. The touch screen 112 may have a resolution in excess of 100 dpi. In an exemplary embodiment, the touch screen has a resolution of approximately 168 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

A touch-sensitive display in some embodiments of the touch screen 112 may be as described in the following applications: (1) U.S. patent application Ser. No. 11/381,313, "Multipoint Touch Surface Controller," filed on May 2, 2006; (2) U.S. patent application Ser. No. 10/840,862, "Multipoint Touchscreen," filed on May 6, 2004; (3) U.S. patent application Ser. No. 10/903,964, "Gestures For Touch Sensitive Input Devices," filed on Jul. 30, 2004; (4) U.S. patent application Ser. No. 11/048,264, "Gestures For Touch Sensitive Input Devices," filed on Jan. 31, 2005; (5) U.S. patent application Ser. No. 11/038,590, "Mode-Based Graphical User Interfaces For Touch Sensitive Input Devices," filed on Jan. 18, 2005; (6) U.S. patent application Ser. No. 11/228,758, "Virtual Input Device Placement On A Touch Screen User Interface," filed on Sep. 16, 2005; (7) U.S. patent application Ser. No. 11/228,700, "Operation Of A Computer With A Touch Screen Interface," filed on Sep. 16, 2005; (8) U.S. patent application Ser. No. 11/228,737, "Activating Virtual Keys Of A Touch-Screen Virtual Keyboard," filed on Sep. 16, 2005; and (9) U.S. patent application Ser. No. 11/367,749, "Multi-Functional Hand-Held Device," filed on Mar. 3, 2006. All of these applications are incorporated by reference herein.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a click wheel as an input control device 116. A user may navigate among and interact with one or more graphical objects (henceforth referred to as icons) displayed in the touch screen 112 by rotating the click wheel or by moving a point of contact with the click wheel (e.g., where the amount of movement of the point of contact is measured by its angular displacement with respect to a center point of the click wheel. The click wheel may also be used to select one or more of the displayed icons. For example, the user may press down on at least a portion of the click wheel or an associated physical button. User commands and navigation commands provided by the user via the click wheel may be processed by an input controller 160 as well as one or more of the modules and/or sets of instructions in memory 102.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIG. 1 shows an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module), the optical sensor 164 may capture still images or video. In some embodiments, an optical sensor is located on the back of the device 100, opposite the touch screen display 112 on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIG. 1 shows a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. No. 11/241,839, "Proximity Detector In Handheld Device," filed Sep. 30, 2005, and Ser. No. 11/240,788, "Proximity Detector In Handheld Device," filed Sep. 30, 2005, which are hereby incorporated by reference. In some embodiments, the proximity sensor turns off and disables the touch screen 112 when the multifunction device is placed near the user's ear (e.g., when the user is making a phone call). In some embodiments, the proximity sensor keeps the screen off when the device is in the user's pocket, purse, in a carrying case, or other dark area to prevent unnecessary battery drainage when the device is a locked state.

The device 100 also includes one or more acceleration sensors, or accelerometers, 168. The acceleration sensor(s) are responsive to accelerations experienced by the device 100 as a whole and generate one more signals 169 that encode the characteristics of such acceleration events. Some embodiments employ three acceleration sensors 168, each dedicated to sensing accelerations along a different normal axis of motion. Employing three such sensors in this configuration enables the detection of accelerations in any direction. Different types of acceleration sensors can be employed for this function as long as they generate a suitable output signal(s) 169 and can be accommodated within the form factor of a portable electronic device 100. Types of acceleration sensors that can be used include MEMS ICs (micro-electromechanical system integrated circuits), variable capacitance sensors, piezoelectric sensors, piezoresistive sensors, or servo force balance (i.e., beam type) sensors. A more detailed discussion of acceleration sensors is provided in Applicant's U.S. Patent Publication No. 20050190059, "Acceleration-based Theft Detection System for Portable Electronic Devices," and U.S. Patent Publication No. 20060017692, "Methods and Apparatuses for Operating a Portable Device Based on an Accelerometer," both of which are incorporated herein by reference.

The acceleration sensor signal(s) 169 is analyzed by an alert processing module 133, which, among other things, determines whether an acceleration event, or "shock," is due to a predetermined user gesture (e.g., a user "smack" on the device body) with an associated action to be initiated by the alert processing module 133. In the present application the terms "smack," "slap" and similar terms are used to denote quick contacts with, or blows to, the body of the device—typically delivered with a user's open hand, fingers or appropriate object—that produce a brief shock to the device 100 that is registered by the accelerometer, which outputs a corresponding, characteristic signal 169. One characteristic of such a slap or smack is that it can be registered by the accelerometer when the device is sitting on a solid surface, or even in the user's pocket, carrying case, bag, or backpack. In some embodiments, a "smack" is defined as an event that causes back and forth acceleration, in substantially opposite directions, of at least a predefined magnitude within a predefined period of time. In some embodiments, the predefined period of time is less than 0.1 second.

Actions that can be taken by the device 100 in response to a smack can include, without limitation, silencing an audible alert and/or changing an alert mode (e.g., to silent mode, or vibrate mode). In some embodiments, acceleration characteristics evaluated by the alert processing module 133 include the strength, directionality (e.g., whether the event includes back and forth motion, in opposite directions) and duration of an acceleration event, and in some cases, displacement of the device 100 due to the acceleration event, as encoded by the acceleration sensor signal(s) 169. In FIG. 1 the acceleration sensor(s) 168 is coupled to the peripherals interface 118 via a bus or direct connection 103. Alternately, the acceleration sensor(s) may be coupled to an input controller 160 in the I/O subsystem 106.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, an alert processing module 133 and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module 130 may detect contact with the touch screen 112 (in conjunction with the display controller 156) and other touch sensitive devices (e.g., a touchpad or click wheel). The contact/motion module 130 includes various software components for performing various operations related to detection of contact, such as determining if contact has occurred, determining if there is movement of the contact and tracking the movement across the touch screen 112, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multi-touch"/multiple finger contacts). In some embodiments, the contact/motion module 130 and the display controller 156 also detects contact on a touchpad. In some embodiments, the contact/motion module 130 and the controller 160 detects contact on a click wheel.

The graphics module 132 includes various known software components for rendering and displaying graphics on the touch screen 112, including components for changing the intensity of graphics that are displayed. As used herein, the term "graphics" includes any object that can be displayed to a user, including without limitation text, web pages, icons (such as user-interface objects including soft keys), digital images, videos, animations and the like.

The text input module 134, which may be a component of graphics module 132, provides soft keyboards for entering text in various applications (e.g., contacts 137, e-mail 140, IM 141, blogging 142, browser 147, and any other application that needs text input).

The GPS module 135 determines the location of the device and provides this information for use in various applications (e.g., to telephone 138 for use in location-based dialing, to camera 143 and/or blogger 142 as picture/video metadata, and to applications that provide location-based services such as weather widgets, local yellow page widgets, and map/navigation widgets).

The alert processing module 133 analyzes signals 169 from the acceleration sensor(s) 168 and the audio circuitry 110 to determine whether a user has made a predetermined gesture related to device alerts and, if so, triggers an action or actions associated with the predetermined gesture. Possible actions include silencing an active audible alert issuing from the speaker 111 and/or changing an alert mode. In some embodiments, the predetermined gesture is a light "smack" or tap by the user on a surface of the device, which can be detected by the acceleration sensor(s) 110 even when the device is in the user's pocket. Upon detecting a predetermined user gesture (and presuming the device is still sounding an alert), the alert processing module 133 silences the speaker 111 via a control signal or instruction ultimately issued by the peripherals interface 118 to the audio circuitry 110. All signals and instructions between the alert processing module 133 and the hardware and software modules mentioned herein are exchanged via the interfaces 118. In some embodiments, in addition to silencing active audible alerts, the alert processing module 133 can automatically modify alert settings associated with specific applications 136, or the device as whole, to prevent additional unwelcome audible alerts. For example, after detecting a predetermined user gesture and silencing an active, audible alert, the alert processing module 133 can temporarily suppress all subsequent audible alerts from the application 136 that triggered the silenced alert, or the multifunction device 100 as a whole. In these embodiments the alert processing module can also automatically and permanently change an audible alert mode to an inaudible alert mode, such as "Silent" or "Vibrate." In other embodiments, a user can restore the alert mode to its original settings by issuing a different, predetermined gesture on the device. One such predetermined gesture might be a closely spaced pair of taps or smacks on the Device (e.g., a plurality of smacks exerted on the device within a predefine time window, such of 0.5 second).

In different embodiments, the device 100 can be configured to have a range of responses based on user taps or smacks that are detectable by the accelerometer 168 and/or the touch screen 112. Some possible alternate embodiments include, without limitation:

- double tap/smack required to silence the alert;
- smack or double smack to silence the device even in the absence of an alert; and
- using the touch screen 112 as the sensor for the device silencing gesture.

In various embodiments the gesture may be a gesture that is detectable by the accelerometer 168 or the touch screen 112 and that is not necessarily a smack or tap; for example, such a gesture might be a swirl or a shake—each could be processed based on its characteristic signals 169. In some embodiments, gestures, taps or smacks exerted on the device may trigger a range of device responses and convey a range of meanings, including, but not limited to:

- a "device silencing gesture,"
- an "alert suppressing gesture," or
- a "device alert mode modification" gesture.

In addition, the user gesture can be used to change the mode of a device or perform other functions completely apart from silencing an audio alert. Examples of this might be using a double slap to put the device 100 into a Silent mode, or using a single slap to put the device 100 into a Ring mode, regardless of whether there is an active alert or the device has previously been silenced by a slap.

In some embodiments, processing in response to smacks or other gestures detected by the accelerometer 168 might only become active when the device is proximate to an object that is sensed by the touch screen or a proximity sensor. This could be done for users who desire to quickly silence or otherwise modify the mode of a device when it is inaccessible, as when it is in a pocket or sitting on a table.

The applications 136 may include the following modules (or sets of instructions), or a subset or superset thereof:

- a contacts module 137 (sometimes called an address book or contact list);
- a telephone module 138;
- a video conferencing module 139;
- an e-mail client module 140;
- an instant messaging (IM) module 141;
- a blogging module 142;
- a camera module 143 for still and/or video images;
- an image management module 144;
- a video player module 145;
- a music player module 146;
- a browser module 147;
- a calendar module 148;
- widget modules 149, which may include weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6; and/or
- search module 151.

Examples of other applications 136 that may be stored in memory 102 include memo pad and other word processing applications, JAVA-enabled applications, encryption, digital rights management, voice recognition, and voice replication.

In conjunction with touch screen 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth. Embodiments of user interfaces and associated processes using contacts module 137 are described further below.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies. Embodiments of user interfaces and associated processes using telephone module 138 are described further below.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, the videoconferencing module 139 may be used to initiate, conduct, and terminate a video conference between a user and one or more other participants. Embodiments of user interfaces and associated processes using videoconferencing module 139 are described further below.

In conjunction with RF circuitry 108, touch screen 112, display controller 156, contact module 130, graphics module 132, and text input module 134, the e-mail client module 140 may be used to create, send, receive, and manage e-mail. In conjunction with image management module 144, the e-mail module 140 makes it very easy to create and send e-mails with still or video images taken with camera module 143. Embodiments of user interfaces and associated processes using e-mail module 140 are described further below.

In conjunction with RF circuitry 108, touch screen 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol), to receive instant messages and to view received instant messages. In some embodiments, transmitted and/or received instant messages may include graphics, photos, audio files, video files and/or other attachments as are supported in a MMS and/or an Enhanced Messaging Service (EMS). Embodiments of user interfaces and associated processes using instant messaging module 141 are described further below.

In conjunction with RF circuitry 108, touch screen 112, display controller 156, contact module 130, graphics module 132, text input module 134, image management module 144, and browsing module 147, the blogging module 142 may be used to send text, still images, video, and/or other graphics to a blog (e.g., the user's blog). Embodiments of user interfaces and associated processes using blogging module 142 are described further below.

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102. Embodiments of user interfaces and associated processes using camera module 143 are described further below.

In conjunction with touch screen 112, display controller 156, contact module 130, graphics module 132, text input module 134, and camera module 143, the image management module 144 may be used to arrange, modify or otherwise manipulate, label, delete, present (e.g., in a digital slide show or album), and store still and/or video images. Embodiments of user interfaces and associated processes using image management module 144 are described further below.

In conjunction with touch screen 112, display controller 156, contact module 130, graphics module 132, audio circuitry 110, and speaker 111, the video player module 145 may be used to display, present or otherwise play back videos (e.g., on the touch screen or on an external, connected display via external port 124). Embodiments of user interfaces and associated processes using video player module 145 are described further below.

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files. In some embodiments, the device 100 may include the functionality of an MP3 player, such as an iPod (trademark of Apple Computer, Inc.). Embodiments of user interfaces and associated processes using music player module 146 are described further below.

In conjunction with RF circuitry 108, touch screen 112, display system controller 156, contact module 130, graphics module 132, and text input module 134, the browser module 147 may be used to browse the Internet, including searching, linking to, receiving, and displaying web pages or portions thereof, as well as attachments and other files linked to web pages. Embodiments of user interfaces and associated processes using browser module 147 are described further below.

In conjunction with RF circuitry 108, touch screen 112, display system controller 156, contact module 130, graphics module 132, text input module 134, e-mail module 140, and browser module 147, the calendar module 148 may be used to create, display, modify, and store calendars and data associated with calendars (e.g., calendar entries, to do lists, etc.). Embodiments of user interfaces and associated processes using calendar module 148 are described further below.

In conjunction with RF circuitry 108, touch screen 112, display system controller 156, contact module 130, graphics module 132, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets). Embodiments of user interfaces and associated processes using widget modules 149 are described further below.

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget). Embodiments of user interfaces and associated processes using widget creator module 150 are described further below.

In conjunction with touch screen 112, display system controller 156, contact module 130, graphics module 132, and text input module 134, the search module 151 may be used to search for text, music, sound, image, video, and/or other files in memory 102 that match one or more search criteria (e.g., one or more user-specified search terms). Embodiments of user interfaces and associated processes using search module 151 are described further below.

In conjunction with the acceleration sensors 168, audio circuitry 110, touch screen 112, display system controller 156, graphics module 132 and text input module 134, the alert processing module 133 may be used to monitor, control, silence and program the audible alerts that are generated by the applications 136 and other software and hardware modules with the capacity to trigger audible alerts. The alert processing module 133 can also be configured to define program alert settings for the device as a whole and for specific application programs 136. In some embodiments, many of the applications 136 are configurable to trigger audible alerts in response to incoming messages, status changes, or the existence of critical conditions. Table 1 below lists just a few of the examples of audible alerts that can be issued by respective applications 136:

TABLE 1

| Module | Alert Type(s) |
| --- | --- |
| Telephone Module 138 | Incoming calls, New voicemail messages |
| Video Conference Module 139 | Incoming video conference calls |
| E-mail Client Module 140 | Incoming emails |
| Instant Messaging Module 141 | Incoming messages |
| Calendar Module 148 | Meeting alerts |
| Weather Widget 149-1 | Severe weather alerts |
| Stocks Widget 149-2 | Buy, Sell alerts |
| Alarm Clock Widget 149-4 | Alarms set by user |

The alert processing module 133 is configured to interact with each of these other software modules and the operating system to control and/or modify any of the respective module's program settings related to configuration of audible alerts. This operation is further described in reference to FIG. 5.

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 2:
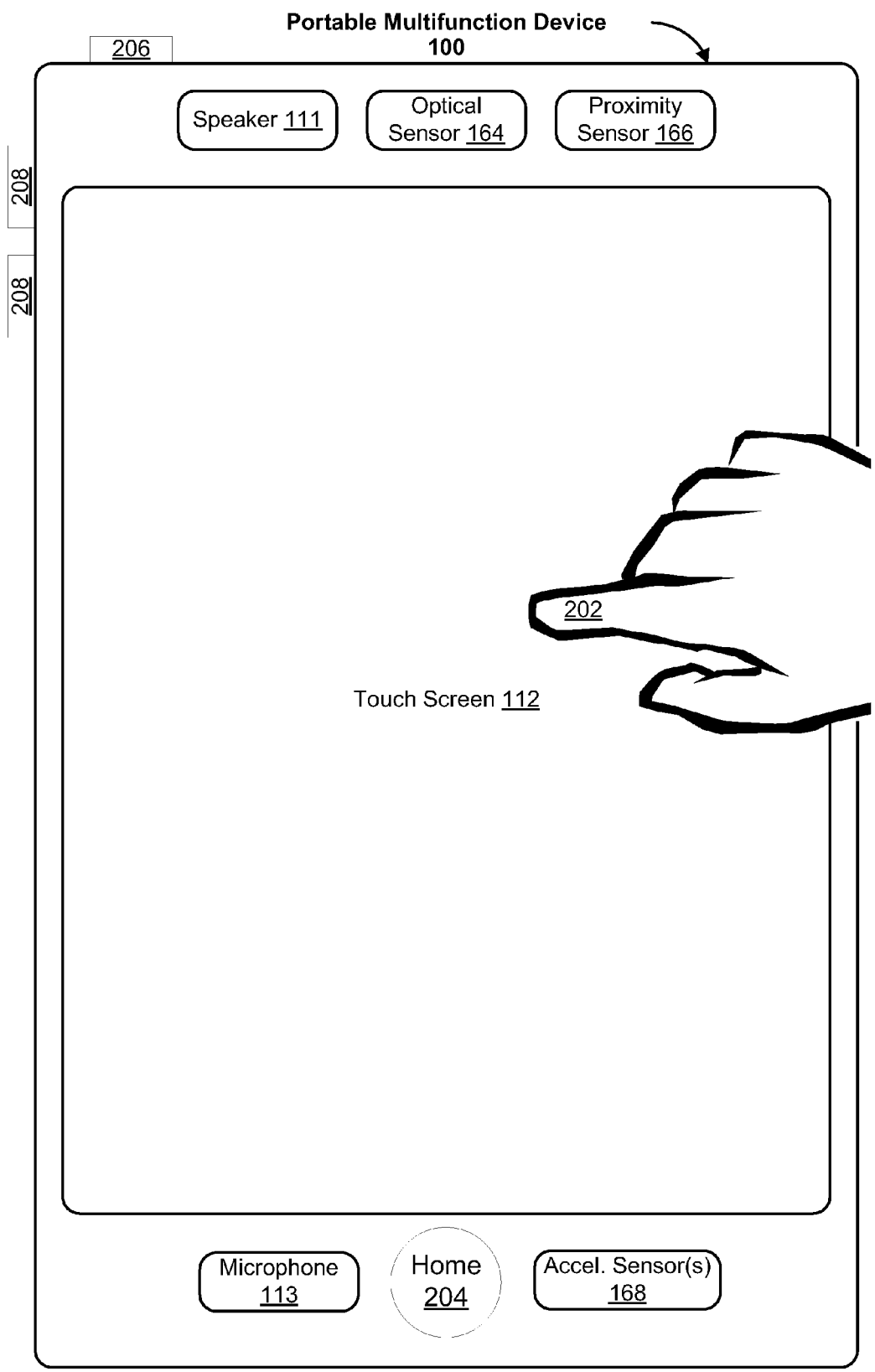
FIG. 2 illustrates a portable multifunction device having a touch screen and an acceleration sensor in accordance with some embodiments.

FIG. 2 illustrates a portable multifunction device 100 having a touch screen 112 in accordance with some embodiments. The touch screen may display one or more graphics. In this embodiment, as well as others described below, a user may select one or more of the graphics by making contact or touching the graphics, for example, with one or more fingers 202 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward and/or a rolling of a finger (from right to left, left to right, upward and/or downward) that has made contact with the device 100. In some embodiments, inadvertent contact with a graphic may not select the graphic. For example, a swipe gesture with that sweeps over an application icon may not select the corresponding application when the gesture corresponding to selection is a tap.

The device 100 may also include one or more physical buttons, such as "home" or menu button 204. As described previously, the menu button 204 may be used to navigate to any application 136 in a set of applications that may be executed on the device 100. Alternatively, in some embodiments, the menu button is implemented as a soft key in a GUI in touch screen 112.

In one embodiment, the device 100 includes a touch screen 112, a menu button 204, a push button 206 for powering the device on/off and locking the device, and volume adjustment button(s) 208. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

Attention is now directed towards embodiments of user interfaces ("UI") and associated processes that may be implemented on a portable multifunction device 100.

Figure 3:
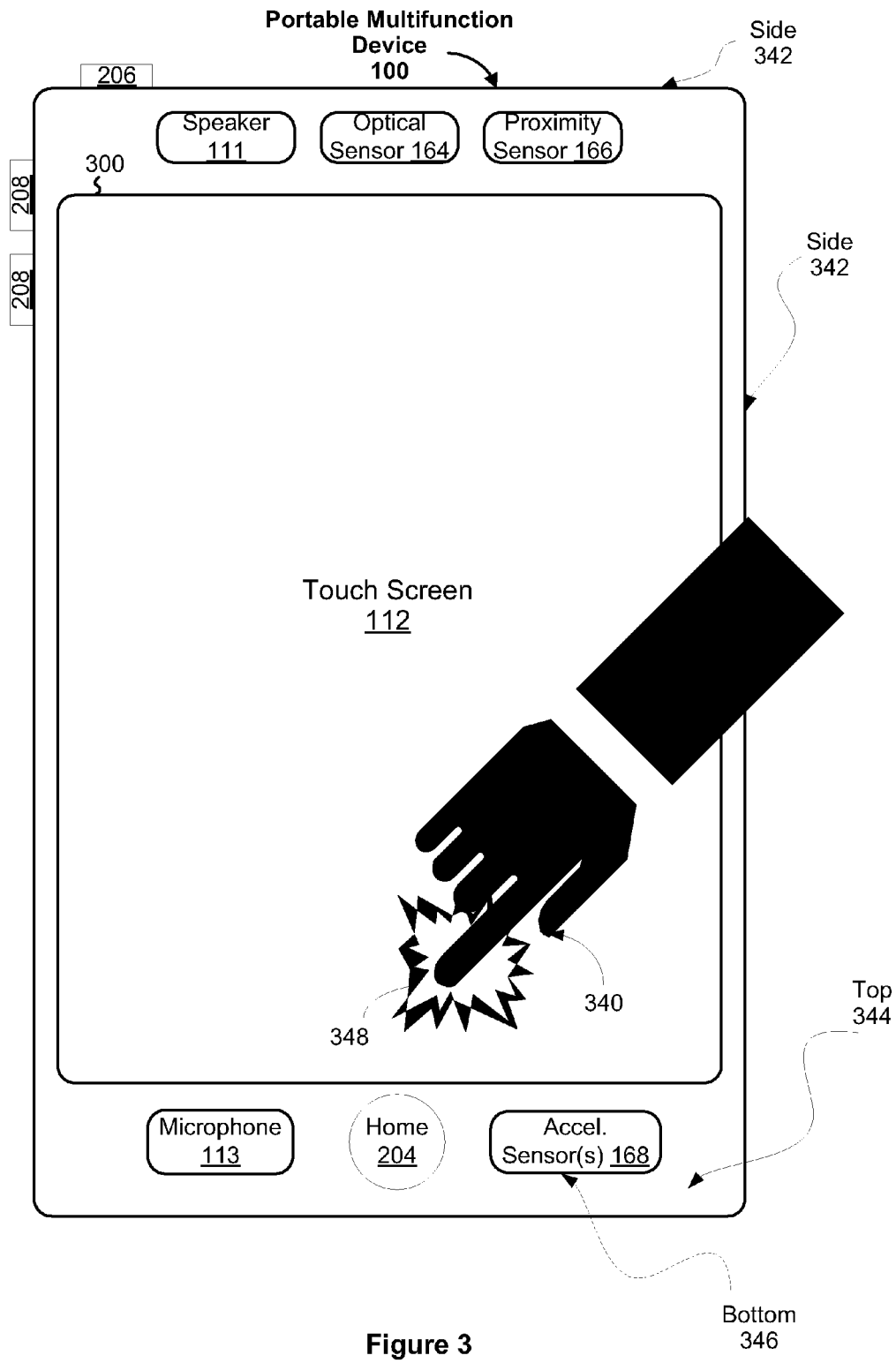
FIG. 3 illustrates a portable multifunction device having a touch screen and an acceleration sensor in accordance with some embodiments.

FIG. 3 illustrates an exemplary user interface 300 for a portable electronic device that is responsive to user gestures detectable by the acceleration sensor(s) 168. The illustrated embodiment shows the use of the user interface 300 to silence an audible alert issued by the speakers 111. There are countless other uses of this interface, which, in view of this disclosure, may occur to those who are skilled in the design, engineering and manufacture of portable electronic devices.

As described with reference to FIG. 1, the device 100 includes one or more acceleration sensors 168 that are responsive to acceleration events experienced by the device 100. In some embodiments, the acceleration sensors 168 are configured to detect brief acceleration events, such as occur when a user "smacks" a portion 348 of the device 100 with their hand 340. In some embodiments the acceleration sensors are configured to be responsive to a smack on the top/front 344, bottom/back 346, or sides 342 of the device 100. In other embodiments, the acceleration sensors are configured so they are responsive only to smacks on one or two surfaces of the device. For example, to prevent damage to the touch screen 112 or internal components of the device 100, the accelerometer might only be responsive to smacks on the bottom/back 346 and sides 342 of the device. The capability of the user interface to respond to accelerations can be employed in different situations to enable a user to interact with the device 100 through gross movements/gestures. The response of the device 100 to a user contact 348 detected by the acceleration sensor(s) 168 depends on configuration of the alert processing module 133 and alert settings associated with that module, which are described below in reference to FIG. 5. The user interface 300 permits a user to modify alert behavior of the device 100 without needing to interact with its touch screen and/or other user interface features, such as buttons, switches, dials or stylus interface. As a result, a user can perform many tasks, such as silencing alerts and modifying alert settings without even needing to take the device 100 out of their pocket. In other embodiments, a user can perform similar tasks using gross gestures with the object as a whole without any need to directly manipulate the device's fine-grain user interface features, such as the aforementioned touch screen, buttons, switches and dials.

In some embodiments, the device 100 can be configured to be responsive to smacks without the use of an accelerometer(s) 168. In these embodiments the touch screen 112 is programmed to recognize brief, non-specific smacks that cover a large area of the touch screen 112 when compared to a touch by a finger or an object, such as a stylus, that is intended to interact with fine grain device features, such as application icons or widgets. These smacks can be recognized by the touch screen 112 when the device 100 is on a surface, or in a case or pocket, where the touch screen 112 is accessible to a direct touch (such as when it is sitting face up on a table, or face out in a pocket).

Figure 4:
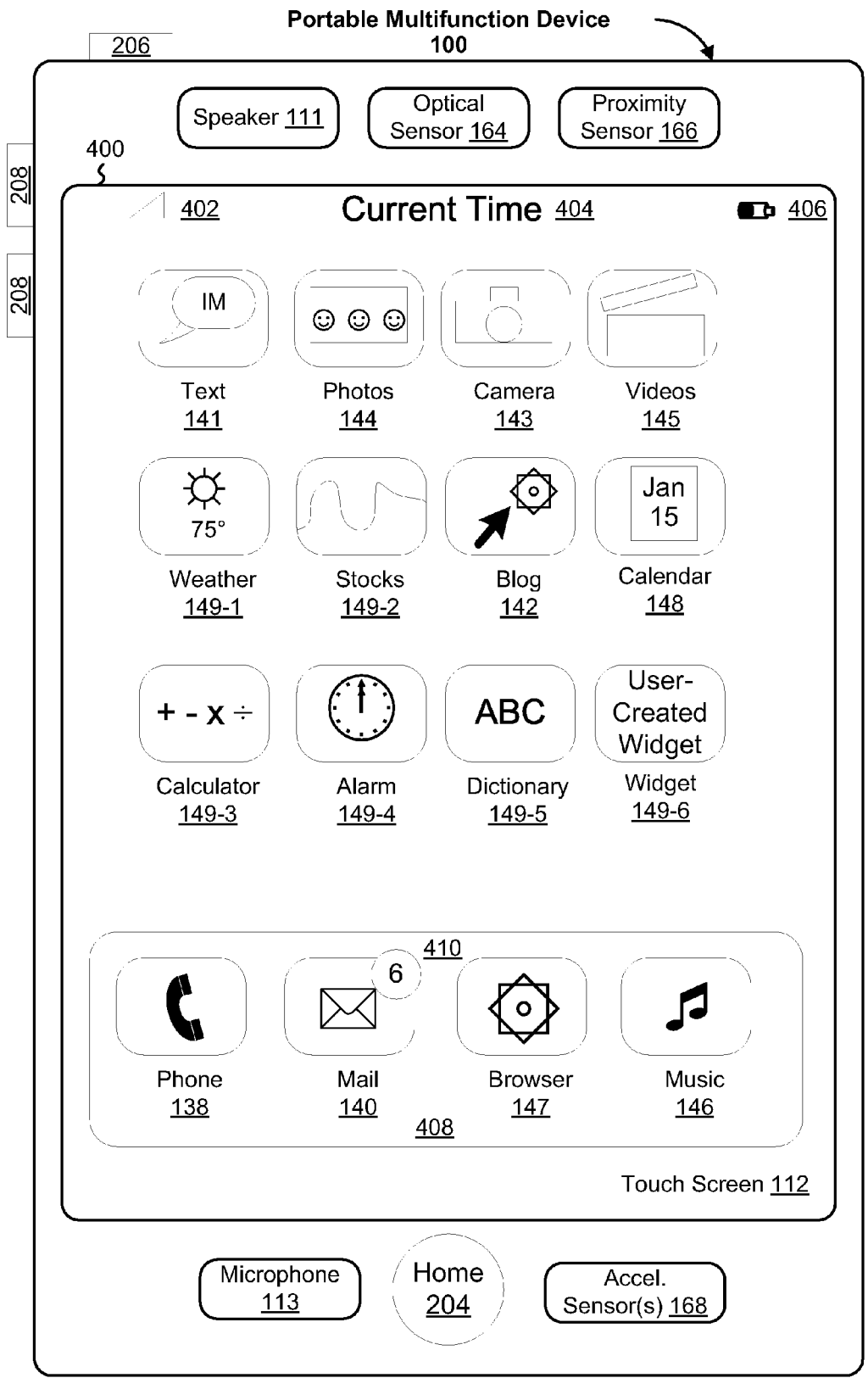
FIG. 4 illustrates an exemplary user interface for a menu of applications on a portable multifunction device in accordance with some embodiments.

FIG. 4 illustrates an exemplary user interface for a menu of applications on a portable multifunction device in accordance with some embodiments. In some embodiments, user interface 400 includes the following elements, or a subset or superset thereof:
  Signal strength indicator 402 for wireless communication;
  Time 404;
  Battery status indicator 406;
  Tray 408 with icons for frequently used applications, such as:
    Phone 138;
    E-mail client 140, which may include an indicator 410 of the number of unread e-mails;
    Browser 147; and
    Music player 146; and
  Icons for other applications, such as:
    IM 141;
    Image management 144;
    Camera 143;
    Video player 145;
    Weather 149-1;
    Stocks 149-2;
    Blog 142;
    Calendar 148;
    Calculator 149-3;
    Alarm clock 149-4;
    Dictionary 149-5; and
    User-created widget 149-6.

In some embodiments, UI 400 displays all of the available applications 136 on one screen so that there is no need to scroll through a list of applications (e.g., via a scroll bar). In some embodiments, as the number of applications increase, the icons corresponding to the applications may decrease in size so that all applications may be displayed on a single screen without scrolling. In some embodiments, having all applications on one screen and a menu button enables a user to access any desired application with at most two inputs, such as activating the menu button 204 and then activating the desired application (e.g., by a tap or other finger gesture on the icon corresponding to the application).

In some embodiments, UI 400 provides integrated access to both widget-based applications and non-widget-based applications. In some embodiments, all of the widgets, whether user-created or not, are displayed in UI 400. In other embodiments, activating the icon for user-created widget 149-6 may lead to another UI (not shown) that contains the user-created widgets or icons corresponding to the user-created widgets.

In some embodiments, a user may rearrange the icons in UI 400, e.g., using processes described in U.S. patent application Ser. No. 11/459,602, "Portable Electronic Device With Interface Reconfiguration Mode," filed Jul. 24, 2006, which is hereby incorporated by reference. For example, a user may move application icons in and out of tray 408 using finger gestures.

In some embodiments, UI 400 includes a gauge (not shown) that displays an updated account usage metric for an account associated with usage of the device (e.g., a cellular phone account), as described in U.S. patent application Ser. No. 11/322,552, "Account Information Display For Portable Communication Device," filed Dec. 23, 2005, which is hereby incorporated by reference.

Figure 5:
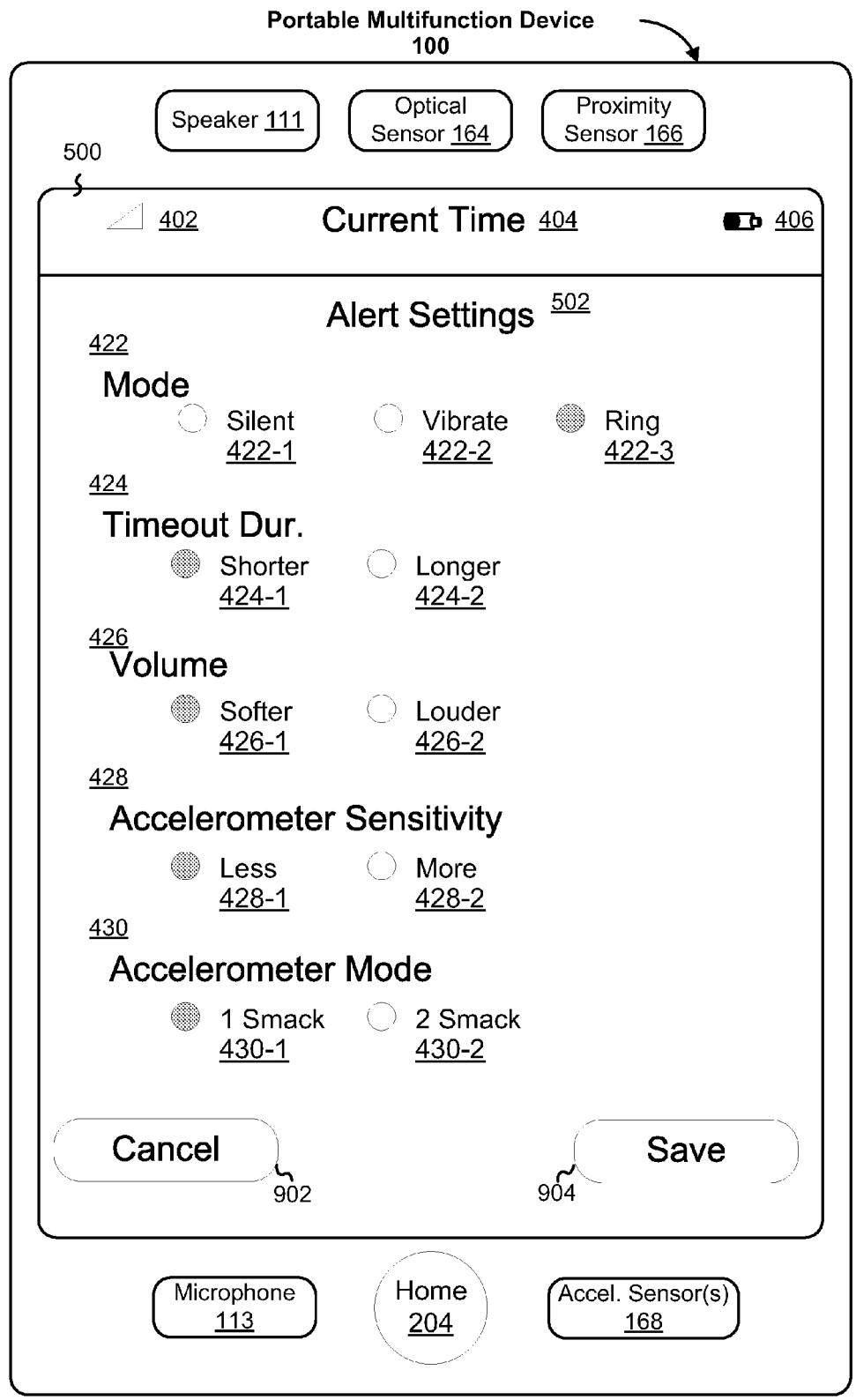
FIG. 5 illustrates an exemplary user interface for a portable multifunction device by which a user can define alert settings in accordance with some embodiments.

FIG. 5 illustrates an exemplary user interface 500 for updating alert settings 502 for the device 100. This is not intended to be an exhaustive documentation of all possible alert settings in accordance with the present invention, but rather an illustration of alert settings that relate to operation of some embodiments of the claimed invention and an interface by which they can modified by a user of the device 100. In other embodiments, different alert settings are possible. Also, these settings, or subsets or supersets thereof, can be applied to the device 100 globally, or to each of the individual applications. In some embodiments, the user interface 500 includes the following elements, or a subset or superset thereof:
  signal strength indicator 402, time 404, and battery status indicator 406, as described above;
  alert mode 422;
  alert timeout duration 424;
  alert volume 426;
  accelerometer sensitivity 428; and
  accelerometer mode 430.

In some embodiments, the alert settings 502 can be adjusted through radio buttons that enable one option to be selected from among multiple options. For example the alert mode 422 has radio buttons 422-1, 422-2 and 422-3 that correspond to three possible alert mode settings (Silent, Vibrate and Ring). In the illustrated embodiment, the alert settings 502 are saved through use of the Save button 904, which is part of the touch screen interface. Changes to the alert settings 502 can be cancelled without taking effect through use of the Cancel button 902, which also is part of the touch screen interface. Other user interface implementations are also possible (e.g., selection lists could be used for each setting, or users could enter custom values for each setting directly into a text box).

The alert mode 422 determines the general behavior of alerts on the device 100. In some embodiments the alert mode can be set to different values, including Silent, Vibrate and Ring. The alert timeout duration setting 424 defines the period of time for which incoming alerts are silenced following user actuation of alert silencing in accordance with some embodiments (e.g., by the user "smacking" the device 100 during an active audible alert). This can be set to be Shorter or Longer than its current setting, which is stored and managed by the alert processing procedure 220. The alert volume setting 426 defines the general volume level associated with audible alerts and can be set with radio buttons to Softer or Louder. These values are also stored and managed by the Alert Processing Module. The accelerometer sensitivity setting 428 is used to modify the sensitivity of, or response to signals 169 from the acceleration sensor 168 so as to reduce false activations of alert silencing or to better accommodate/recognize a particular user's smack style and/or force. The sensitivity setting 428, which is stored and managed by the Alert Processing Module, can be set to Less or More sensitive. For example, if a particular user tends to engage in vigorous movements with the device 100 that would unintentionally trigger alert silencing by the alert processing module 133, the alert sensitivity setting 428 could be reduced. Conversely, if the user tends to smack the device with too little force to trigger alert silencing, the alert sensitivity setting 428 could be increased. In some embodiments, adjustment of accelerometer sensitivity 428 can be implemented by tuning the response of the acceleration sensor(s) 168 or adapting the processing of the alert processing module 133 to different levels and/or other characteristics of the acceleration sensor output signal 169. In some embodiments, the device 100 can be configured with an accelerometer sensitivity training mode wherein the user can calibrate the device 100 (or, in some embodiments, the alert processing module) to recognize the user's unique style of slap and therefore reduce errors in alert silencing (where an error is defined as failure to implement a user's intentions as to alert silencing or alert mode modification). The accelerometer mode setting 430 is used to define the basic use of the accelerometer(s) 168 to detect user gestures. In some embodiments the user can define a gesture type to silence audible alerts (e.g., 1 Smack or 2 Smacks) and a gesture type to modify the alert mode to a default mode, such as Silent (e.g., 1 Smack or 2 Smacks or even a Shake). Other embodiments can provide different or additional accelerometer mode settings to enable different types of alert processing.

The alert settings have been described above in reference to global alert settings 502 for the device 100 as a whole. Individual applications 136 that issue alerts (as described above in reference to Table 1) can also be configured with respective alert settings, which can use the alert setting features described above, or a subset or superset of these features.

Figure 6:
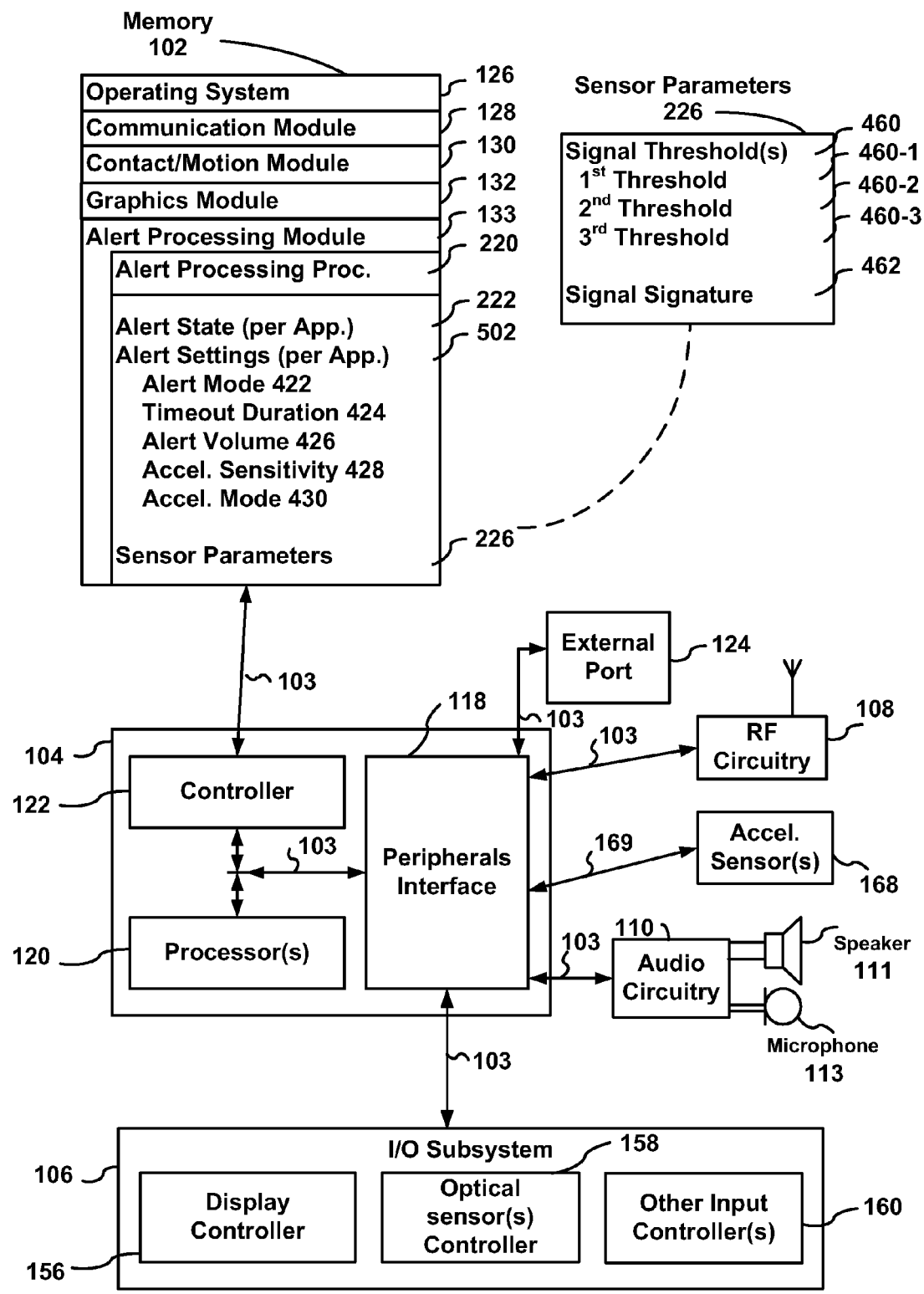
FIG. 6 is a block diagram illustrating functions of the portable multifunction device related to user interaction with device alerts in accordance with some embodiments.

FIG. 6 is a block diagram that shows additional details of one embodiment of an alert processing system for a personal electronic device 100. Many elements of this embodiment have been described in reference to FIG. 1. Other elements, not shown on FIG. 1, include programs and data items associated with the alert processing module 133 that are stored in the memory 102. In some embodiments the alert processing module 133 includes an alert processing procedure 220 that manages the response of the device 100 to alerts and associated gestures of a user that are recognized by the acceleration sensor(s) 168 and reported via the accelerometer output signals 169. In some embodiments the alert processing procedure 220 is also configured to manage general alert settings for the device 100, including receiving and storing alert user settings as described above in reference to FIG. 5.

Data elements stored in the memory 102 that are associated with the alert processing module 133 include alert settings 502, including alert mode 422, alert timeout duration 424, alert volume 426, accelerometer sensitivity 428, and accelerometer mode 430, all of which have been described in reference to FIG. 5. The stored elements also include an alert state 222 that indicates the state of alert processing in the device 100. For example, it can indicate whether an alert timeout is underway in response to a user smack and, if so, how long it is going to remain in effect. Each of these elements can be stored for the device 100 globally and/or for individual applications 136 that have alerts that can be managed by the alert processing module 133. The stored elements also include sensor parameters 226, such as one or more accelerometer signal threshold(s) 460 and an accelerometer signal signature 462 that correspond to signal magnitude and transient characteristics, respectively, of a predetermined user gesture (e.g., the aforementioned smack or pair of smacks). These elements can be employed by the alert processing procedure 220 to interpret the sensor signals 169 output by the acceleration sensor(s) 168 and to determine whether an acceleration event experienced by the device 100 is due to a predetermined user gesture that is associated with silencing an active audio alert. In some embodiments, as described further in reference to FIG. 9, the alert signal threshold(s) 460 include three thresholds 460-1, 460-2, 460-3 that correspond to signal values (time and or signal strength) that need to be approximated and/or exceeded by characteristic portions of the signal 169 for a user smack to be identified as such. Features of the alert processing module 133, or subsets or supersets thereof, can be combined with other programs or modules or can be subdivided among such programs or modules as is appropriate.

Figure 7:
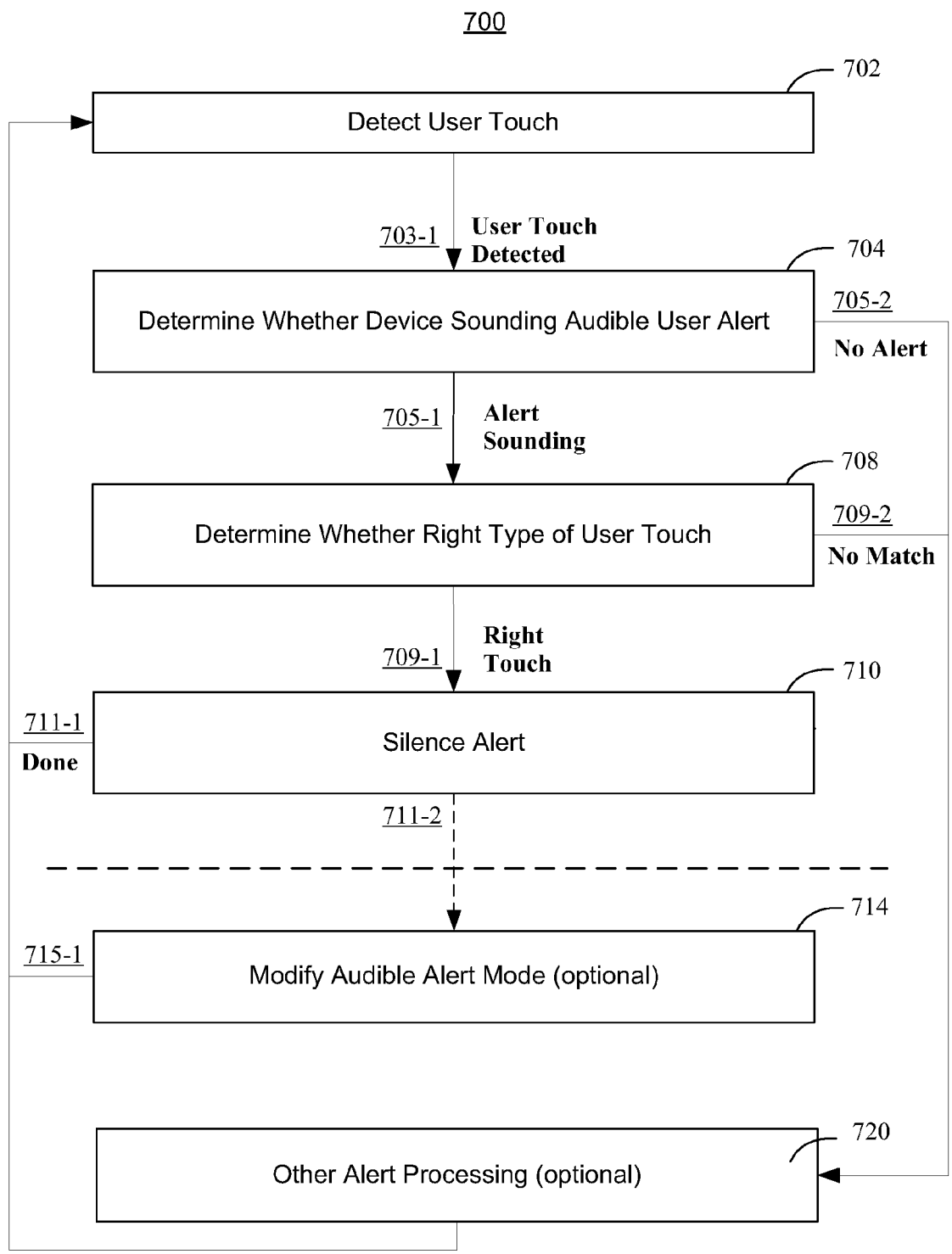
FIG. 7 is a flow chart illustrating a method by which a user can interact with the portable device to silence audible alerts in accordance with some embodiments.

FIG. 7 is a flow chart illustrating a method 700 by which a user can interact with the portable device to silence audible alerts in accordance with some embodiments. If a user touch is detected (702) by the accelerometer(s) (703-1), the device 100 determines whether an audible alert is being issued by the device 100 (704). In some embodiments, the device 100 determines whether an audible alert is being issued by the device 100 (704) prior to detecting (702) a user touch with the accelerometer(s). For example, to save power, the device may determine whether an audible alert is being issued by the device 100 (704) and, if so, the device turns on the accelerometer(s) so that a user touch can be detected (702). If an alert is sounding (705-1), the device 100 determines whether the touch is a smack that would initiate alert silencing (708). If the touch is the right kind of touch (e.g., a user smack) (709-1), the alert is silenced (710). As an optional step, depending on the programming of the device 100, following alert silencing the audible alert settings of the device 100 could be automatically modified (e.g., the device alert mode might be changed from Ring to a different mode, such as Silent or Vibrate) (714). Referring back to operation 708, if the touch reported by the accelerometer was not the right kind of touch to result in device silencing (709-2), or the device is not sounding an alert (705-2), additional alert processing can be optionally initiated (720). Among other operations, additional alert processing 720 can include examining the signals 169 from the accelerometer(s) 168 to determine whether those signals are characteristic of other user interactions that are defined for the device 100. For example, if a user interactions are defined where the device alert mode is changed back to Ring mode after a sequence of some defined number of smacks, or where the device alert mode is changed to Silent in response to a quick gesture with the device as a whole (such as a Shake), processing related to these operations would be performed at step 720.

Figure 8:
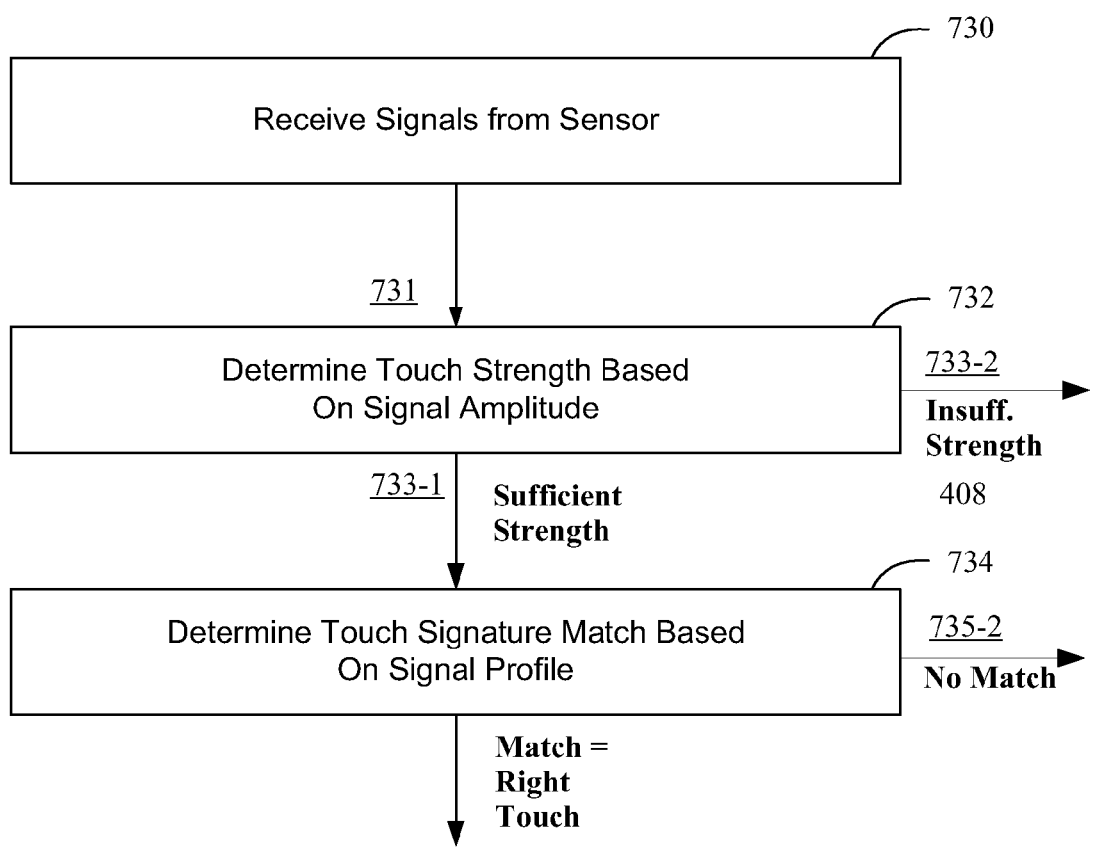
FIG. 8 is a flow chart illustrating additional details of step 406 ("Determine Whether Right Type of User Touch") of FIG. 7 in accordance with some embodiments.

FIG. 8 is a flow chart illustrating additional details of step 708 ("Determine Whether Right Type of User Touch") of FIG. 7 in accordance with some embodiments. The processing in response to detection by the accelerometer 168 of a user touch/acceleration event (730) includes determining the strength of the touch/event based on the amplitude of the accelerometer signal(s) 169. This processing can involve integrating inputs from three sensors 168 and comparing the result(s) to one or more of the signal thresholds 460 stored in the memory 102. If the signals 169 do not correspond to a sufficiently strong touch or smack, then there is no match (meaning that the touch was not a user smack) (733-2). If the signals 169 are sufficiently strong (733-1), then additional processing is performed to determine whether the profile of the signals 169 over time (or as viewed in the frequency domain), approximately matches the signature of a user smack (734). This processing involves comparing the signal(s) 169 to the signal signature 462 stored in the memory 102. For example, transient characteristics of the accelerometer signal(s) 169 may be compared with the signal signature 462. If there is not match, then the touch/acceleration event was not a user smack (735-2).

Figure 9:
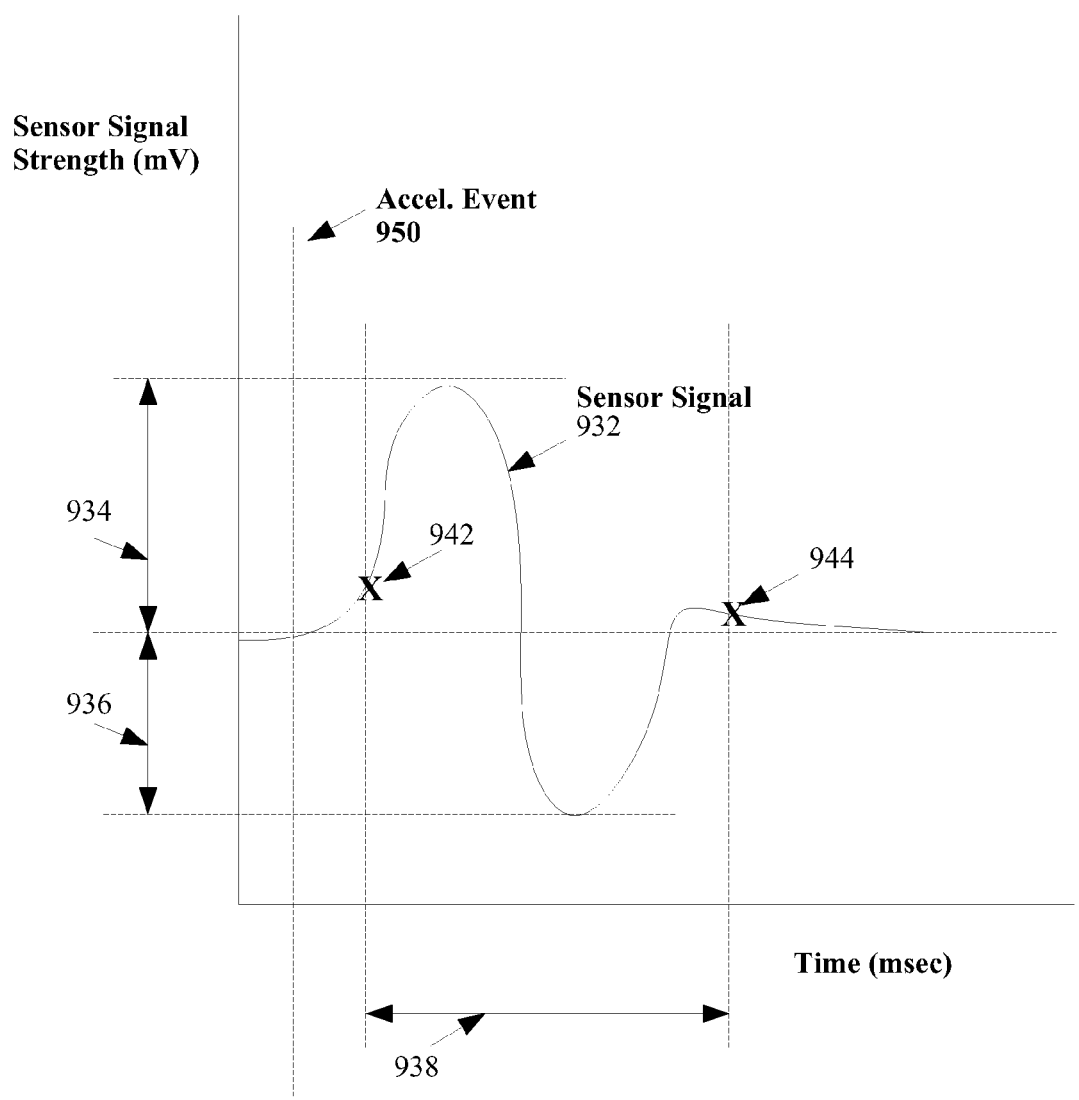
FIG. 9 is a time domain illustration of idealized signals generated by the accelerometer(s) of FIG. 1 in response to particular types of user gestures in accordance with some embodiments.

FIG. 9 is a time domain illustration of idealized signals 169 generated by the accelerometer(s) 168 in response to a particular type of user gesture in accordance with some embodiments. In particular, this illustration shows characteristics of a sensor signal 932 generated by the accelerometer 168 that might result from a user smack delivered to the device 100. This illustration is an abstraction and an actual signal 932 might appear quite different in terms of shape, polarity (the signal might initially actually go negative instead of positive) and amplitude depending on the type of accelerometer and particulars of its mounting on the device 100, the surface of the device 100 to which the smack was delivered, and the direction of the smack. In addition, different sorts of gestures or smacks to which the device 100 is responsive would have different characteristic profiles. For example, a double smack that might be used to reset the alert mode 422 might resemble a pair of sinusoids (compared to the single sinusoid shown by the signal 932) with a small time separation (e.g., within a predefined time window, such as 0.5 second).

FIG. 9 in particular shows a sensor signal 932 output by the accelerometer 168 in response to an idealized user smack and corresponding acceleration event of the device that occurs at a time 950. In response, the signal 932 rises to show the beginning of the acceleration event and crosses an initial threshold at a time 942, indicating that the signal has sufficient strength to be a measurable acceleration event. After it reaches a maximum, the signal 932 falls to a minimum negative value, corresponding to a changing direction of acceleration, and then shows some ringing during which it passes a second threshold 944 while falling. Accordingly, the signal 932 is characterized by a rising amplitude 934 and a falling amplitude 936 that correspond respectively to back and forth accelerations of the device 100 following a user smack at an initial time 950. This pattern of back and forth accelerations is to be expected when a device 100 is smacked while it sitting on a hard surface, such as a table, or in a user's pocket. The time period 938 from the initial threshold time 942 to the second threshold time 944 is captured as it is also characteristic of the type of user gesture associated with an acceleration event. The characteristics of the idealized signal 934, 936 and 938 are stored in the memory as the signal thresholds 460-1, 460-2 and 460-3 (FIG. 6) and the general characteristics of the smack signal 932 are captured as the signal signature 462.

In some embodiments, where the accelerometer 168 and the alert module 133 are used to process multiple different types of gestures, each such gesture would have an associated idealized signal 932 and corresponding signal threshold(s) 460 and signature(s) 462 that are stored in the memory 102 and managed by the alert module 133.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method, comprising:
at a portable electronic device:
detecting with an accelerometer associated with the device a movement of the portable device;
determining whether the movement is due to a predetermined type of user gesture exerted on the portable electronic device, wherein the predetermined type of user gesture is a smack exerted on the portable electronic device; and
if the movement is due to the predetermined type of user gesture and the portable electronic device is emitting an audible alert signal, silencing the audible alert signal and, in addition to silencing the audible alert signal, at least one of:
silencing subsequent audible alerts for a predetermined period of time;
silencing subsequent audible alerts of a similar alert category for a predetermined period of time; and
placing the portable device into an inaudible alert mode.

2. The method of claim 1, wherein placing the portable device into an inaudible alert mode comprises at least one of:
placing the device into a silent mode; and
placing the device into a vibrate mode.

3. The method of claim 1, further comprising:
detecting with the accelerometer a second movement of the portable device;
determining whether the second movement is due to a second predetermined type of user gesture exerted on the portable electronic device; and
if the acceleration event is due to the second predetermined type of user gesture, placing the portable device in an audible alert mode.

4. The method of claim 3, wherein the second predetermined type of user gesture is a plurality of smacks exerted within a predefined time window on the portable device.

5. The method of claim 1, wherein the smack is an event that causes back and forth acceleration, in substantially opposite directions, of at least a predefined magnitude within a predefined period of time.

6. A portable electronic device, comprising:
one or more processors;
memory;
an audible alert emitter;
an accelerometer that is responsive to movement of the device; and
one or more programs, wherein the one or more programs are stored in the memory and configured to be executed by the one or more processors, the programs including instructions for:

detecting with the accelerometer a movement of the portable device;

determining whether the movement is due to a predetermined type of user gesture exerted on the portable electronic device, wherein the predetermined type of user gesture is a smack exerted on the portable electronic device; and, if the movement is due to the predetermined type of user gesture and the portable electronic device is emitting an audible alert signal, silencing the audible alert signal and, in addition to silencing the audible alert signal, at least one of:

silencing subsequent audible alerts for a predetermined period of time;

silencing subsequent audible alerts of a similar alert category for a predetermined period of time; and placing the portable electronic device into an inaudible alert mode.

7. The device of claim 6, wherein placing the portable device into an inaudible alert mode comprises at least one of:

placing the device into a silent mode; and placing the device into a vibrate mode.

8. The device of claim 6, further comprising instructions for:

detecting with the accelerometer a second movement of the portable device;

determining whether the second movement is due to a second predetermined type of user gesture exerted on the portable electronic device; and if the acceleration event is due to the second predetermined type of user gesture, placing the portable device in an audible alert mode.

9. The device of claim 8, wherein the second predetermined type of user gesture is a plurality of smacks exerted within a predefined time window on the portable device.

10. The device of claim 6, wherein the smack is an event that causes back and forth acceleration, in substantially opposite directions, of at least a predefined magnitude within a predefined period of time.

* * * * *